F. SIMMONS.

FRICTION-GEAR.

No. 7,022. Reissued March 28, 1876.

Witnesses:
Ed. W. Dorn
M. Gardner

Inventor:
Franklin Simmons.
per Chas. H. Fowler
Attorney.

UNITED STATES PATENT OFFICE

FRANKLIN SIMMONS, OF NEW ORLEANS, LOUISIANA, ASSIGNOR OF ONE-HALF INTEREST TO H. DUDLEY COLEMAN.

IMPROVEMENT IN FRICTION-GEARS.

Specification forming part of Letters Patent No. 138,444, dated April 29, 1873; reissue No. 7,022, dated March 28, 1876; application filed November 30, 1875.

*To all whom it may concern:*

Be it known that I, FRANKLIN SIMMONS, of New Orleans, parish of Orleans, and State of Louisiana, have invented certain new and useful Improvements in Friction-Gear; and I do hereby declare that the following is a full, clear, and exact description of the same, reference being had to the accompanying drawings, forming a part of this specification, in which—

Figure 1:
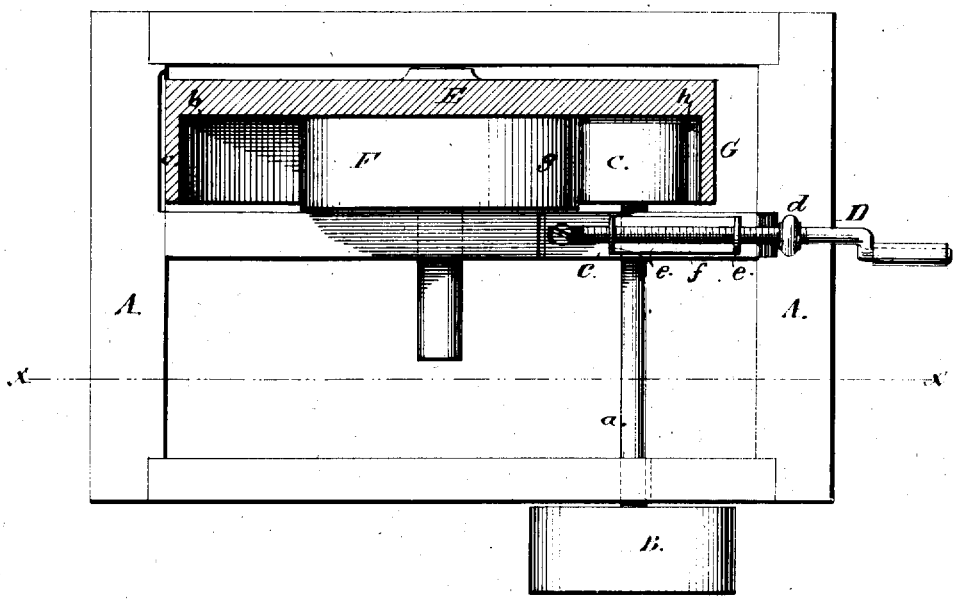
Figure 2:
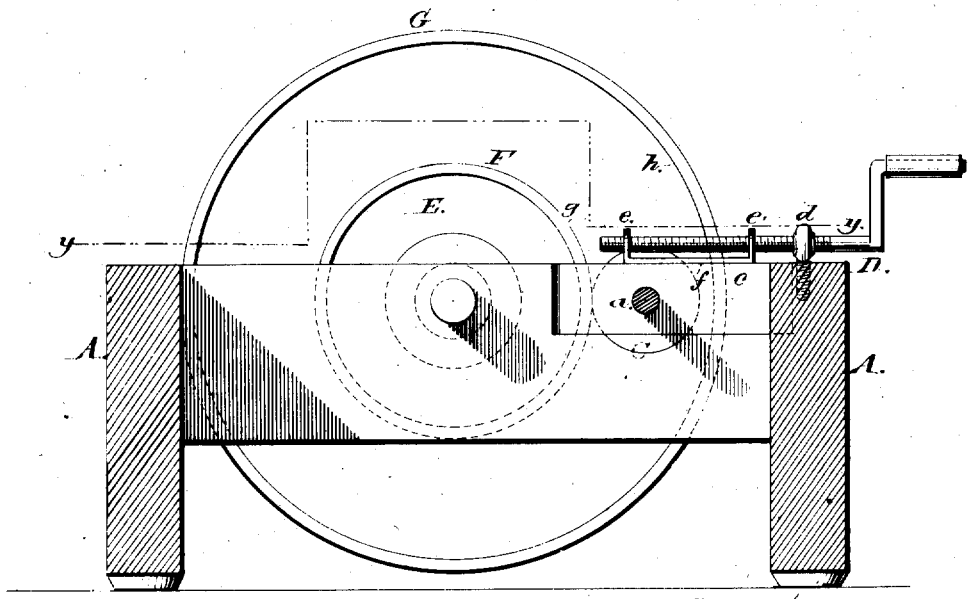

Figure 1 is a plan or top view of my invention, and Fig. 2 a part sectional view taken on the line *x x* of Fig. 1.

This invention has relation to that class of friction-gear in which the speed may be varied by causing the friction pulley or roller to be brought in contact with frictional surfaces of different diameters; and the present invention has for its object to operate the screw or nut of a cotton-press, which, in practice, and when the cotton therein placed is being subjected to pressure, necessarily requires to be run with great power and with moderate speed, while for reversing the same, in order to release the followers, it may be run with great or increased speed, thereby saving time. My invention accomplishes both these results in an exceedingly simple, economical, and effective manner.

My invention, therefore, consists in a pulley or wheel having parallel faces or frictional surfaces of unequal diameters, so that the speed may not only be changed, but the direction of motion reversed.

My invention further consists, in connection with a pulley or wheel having parallel frictional faces or surfaces of unequal diameters, of a frictional pulley so arranged in relation thereto, as will admit of the same being brought in position to engage with either of the two faces or frictional surfaces of the pulley or wheel, for the purpose of securing greater power with less speed, or less power with greater speed, and at the same time reverse the direction of motion.

In the accompanying drawings, A represents a frame-work of suitable form and construction, and upon which a cotton-press may be placed, and also serving to support the several bearings for the shafts and pulleys, and the gearing for operating the press therewith connected. B represents the main driving-pulley, keyed or otherwise secured to the outer end of a shaft, *a*.

Upon the opposite end of the shaft *a* is a small friction-pulley, C, said pulley being capable of a longitudinal adjustment by having the inner end of the shaft near the friction-roller supported or having its bearings in a sliding journal-box, *c*, which is operated by a screw-threaded rod, D, held in position by a standard, *d*, through which it passes loosely, and is connected with the box *c* by the screw-threaded portion of the rod passing through screw-threaded standards *e e*, formed upon the ends of a plate, *f*, the same being rigidly connected to the upper face of the journal-box. The bolt-holes in the base of the journal-box are elongated to an extent that will admit of the box being adjusted to the required distance back or forth.

The double-faced friction pulley or wheel, (represented at E,) which I consider the principal feature of my invention, is formed with rims F G, the frictional faces or surfaces of said rims being of unequal diameters, and arranged opposite to each other, as shown at *g h*. The rim F I have shown as being connected with the external or outer rim G by solid metal; but it is plainly evident that the said rims may be connected, if desired, by radial arms or spokes without in the least degree changing the character of my invention.

It will be seen that by the employment of a wheel or pulley having parallel frictional surfaces of unequal diameters, as above described, the speed may be changed and the direction of motion reversed at pleasure.

For the purpose of running the screw or screws to secure pressure against the cotton, the face of the friction-pulley B is brought in contact with the friction-surface *h* of the rim G, moving the pulley E slowly, and in the same direction as itself runs; and when it is desired to run the screw with a view to relieve the cotton from pressure, the face of the pulley B is brought against, or in contact with, the convex surface *g* of the rim F, giving a motion opposite to that of the pulley B, and much faster than when engaging with the face of the larger rim G. When it is desired to allow the friction-pulley B to run idle, by not engaging it with either face or frictional surface of the rims, sufficient space is left between the rims for that purpose.

Although I have described my invention as applied to a cotton-press, I do not wish to be understood as confining myself thereto, as it may be rendered available for a variety of different mechanical purposes.

Having now fully described my invention, what I claim as new, and desire to secure by Letters Patent, is—

1. A friction-gear consisting of a wheel or pulley having parallel frictional surfaces of unequal diameters, for the purpose of changing the speed and direction of motion, substantially as and for the purpose set forth.

2. The combination of a pulley or wheel having parallel frictional surfaces of unequal diameters with an adjustable frictional pulley or roller, substantially as and for the purpose described.

FRANKLIN SIMMONS.

Witnesses:
H. N. JENKINS,
T. J. ROACH.